United States Patent
Tsubaki (10) Patent No.: US 11,872,986 B2
(45) Date of Patent: Jan. 16, 2024

(54) VEHICLE CONTROL METHOD AND VEHICLE CONTROL DEVICE

(71) Applicant: NISSAN MOTOR CO., LTD., Yokohama (JP)

(72) Inventor: Kenichi Tsubaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/034,877

(22) PCT Filed: Nov. 6, 2020

(86) PCT No.: PCT/IB2020/000925
§ 371 (c)(1),
(2) Date: May 1, 2023

(87) PCT Pub. No.: WO2022/096906
PCT Pub. Date: May 12, 2022

(65) Prior Publication Data
US 2023/0303073 A1 Sep. 28, 2023

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC .... B60W 10/02; B60W 10/06; B60W 10/107; B60W 30/18072; B60W 2030/1809; B60W 2520/10; B60W 2540/10; B60W 2710/021; B60W 2710/0666; B60W 2710/1005; B60W 2710/1016
See application file for complete search history.

(56) References Cited

U.S. PATENT DOCUMENTS 5,474,505 A * 12/1995 Seidel ............... F16H 61/66259
477/49
9,586,586 B1 * 3/2017 Zhang ................. B60W 10/107
(Continued)

FOREIGN PATENT DOCUMENTS

DE 10 2015 208 236 A1 11/2016
EP 3 406 945 A1 11/2018
(Continued)

*Primary Examiner* — Edwin A Young
(74) *Attorney, Agent, or Firm* — Foley & Lardner LLP (57) ABSTRACT

Provided is a vehicle control method in which a controller executes sailing stop control in which, if the conditions for stopping a drive source are satisfied during travel, the drive source is stopped and a coupling element provided in a power transmission path between the drive source and a continuously variable transmission is released for coasting. If the conditions for stopping the drive source are not satisfied, the controller restarts the drive source and estimates the driver's intention to accelerate, and if the driver has an intention to accelerate, the gear ratio of the continuously variable transmission is increased to a higher value than when there is no intention to accelerate, and the coupling element is coupled.

7 Claims, 4 Drawing Sheets

(51) Int. Cl.
  *B60W 10/06* (2006.01)
  *B60W 10/107* (2012.01)
(52) U.S. Cl.
  CPC ....... *B60W 10/107* (2013.01); *B60W 2520/10* (2013.01); *B60W 2540/10* (2013.01); *B60W 2710/021* (2013.01); *B60W 2710/0666* (2013.01); *B60W 2710/1005* (2013.01); *B60W 2710/1016* (2013.01)

(56) References Cited

U.S. PATENT DOCUMENTS

| | | |
|---|---|---|
| 2011/0246042 A1 | 10/2011 | Tomokuni et al. |
| 2018/0050590 A1 | 2/2018 | Karpenman et al. |
| 2018/0244256 A1 | 8/2018 | Oota et al. |
| 2019/0024793 A1* | 1/2019 | Oota ....................... F16H 59/18 |

FOREIGN PATENT DOCUMENTS

| | | | |
|---|---|---|---|
| JP | 2010-132132 A | 6/2010 | |
| JP | 2017-065648 A | 4/2017 | |
| JP | 2018-509572 A | 4/2018 | |
| WO | WO-2017/057367 A1 | 4/2017 | |
| WO | WO-2017/126475 A1 | 7/2017 | |

* cited by examiner

VEHICLE CONTROL METHOD AND VEHICLE CONTROL DEVICE

TECHNICAL FIELD

The present invention relates to control of a vehicle that executes sailing stop control.

BACKGROUND ART

Sailing stop control is known in which, when a sailing stop condition is satisfied, a drive source is stopped and an engagement element interposed between the drive source and a continuously variable transmission is released for performing coasting. JP2017-65648A discloses a cancellation method of sailing stop control in which, when an upward gradient exceeds a predetermined value during execution of the sailing stop control, a drive source is started and a continuously variable transmission is downshifted, and when the downshifting is completed, the engagement element is engaged. According to the cancellation method, it is possible to quickly generate a vehicle propulsion for re-acceleration.

However, in the cancellation method according to the above-mentioned document, an acceleration performance after the cancellation of the sailing stop control may not meet an acceleration intention of a driver. For example, in a case where the driver does not intend to accelerate the vehicle when the sailing stop control is cancelled, the vehicle propulsion obtained by the downshifting becomes excessive, and speed control becomes difficult.

Therefore, an object of the present invention is to appropriately cancel the sailing stop control in accordance with the acceleration intention of the driver.

According to an embodiment of the present invention, a vehicle control method executed by a computer, wherein the controller executes sailing stop control in which, when a drive source stop condition is satisfied during traveling, a drive source is stopped and an engagement element provided in a power transmission path between the drive source and a continuously variable transmission is released for traveling by inertia, is provided. In this vehicle control method, the controller restarts the drive source when the drive source stop condition becomes unsatisfied, estimates an acceleration intention of a driver, and sets, in a case of a driver having acceleration intention, a gear ratio of the continuously variable transmission to be larger than that of a case where the driver does not have the acceleration intention, and then engages the engagement element.

DESCRIPTION OF EMBODIMENTS

Hereinafter, embodiments of the present invention will be described with reference to the drawings.

[Configuration of Vehicle]

Figure 1:
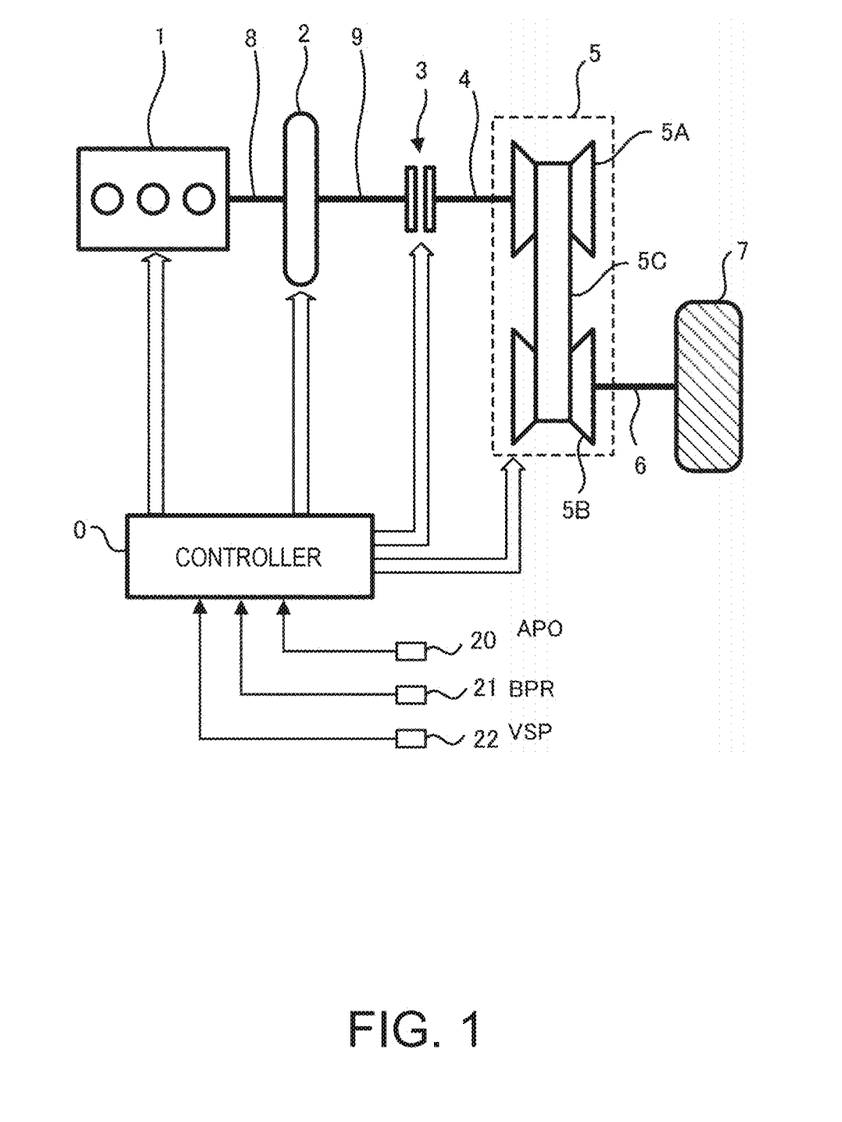
FIG. 1 is a schematic configuration diagram of a vehicle.

FIG. 1 is a schematic configuration diagram of a vehicle according to the present embodiment. The vehicle includes an engine 1 as a drive source, a torque converter 2, a forward clutch 3 as an engagement element, a continuously variable transmission 5, a drive wheel 7, and a controller 10. In this vehicle, rotation generated by the engine 1 is transmitted to the drive wheel 7 via the torque converter 2, the forward clutch 3, and the continuously variable transmission 5.

The engine 1 is, for example, an internal combustion engine. The torque converter 2 includes a lock-up clutch (not illustrated) for directly connecting a first input shaft 8 and a first output shaft 9.

The forward clutch 3 is an element of a forward and reverse switching mechanism (not illustrated) that switches between directly transmitting and reversely transmitting an input rotation via the torque converter 2 to a second input shaft 4, which is an input shaft of the continuously variable transmission 5. When the forward clutch 3 is engaged, the input rotation via the torque converter 2 is directly transmitted from the engine 1 to the second input shaft 4.

The continuously variable transmission 5 includes a primary pulley 5A, a secondary pulley 5B, and a belt 5C. In the continuously variable transmission 5, a hydraulic pressure supplied to the primary pulley 5A and a hydraulic pressure supplied to the secondary pulley 5B are controlled, so that a contact radius between each of the pulleys 5A and 5B and the belt 5C is changed, and a gear ratio is changed. The gear ratio referred to herein indicates a ratio Nout/Nin between a rotation speed Nin of the second input shaft 4 and a rotation speed Nout of a second output shaft 6, in other words, a ratio between rotation speeds of the primary pulley 5A and the secondary pulley 5B.

Hydraulic pressures are supplied to the forward clutch 3 and the continuously variable transmission 5 by an oil pump (not illustrated). The oil pump may be driven by using a part of power of the engine 1, or may be an electric oil pump.

The controller 10 controls operations of the engine 1 and the continuously variable transmission 5. The controller 10 receives a detection signal of an operation state sensor that detects an operation state of the engine 1, and executes a predetermined calculation based on the operation state to set a fuel injection amount, a fuel injection timing, and an ignition timing of the engine 1. As the operation state sensor, an accelerator sensor 20 that detects an operation amount of an accelerator pedal by the driver, a brake sensor 21 that detects a brake depression force based on a depression amount of a brake pedal by the driver, a vehicle speed sensor 22 that detects a vehicle speed, and the like are provided, and an air flow meter, a throttle sensor, an air/fuel ratio sensor, and the like that are not illustrated are also provided.

The controller 10 determines a shift range selected by the driver based on a signal from a shift position sensor (not illustrated), sets a target gear ratio of the continuously variable transmission 5 based on an accelerator position (accelerator opening degree), the vehicle speed, and the like, and applies a predetermined pulley thrust corresponding to the target gear ratio to the primary pulley 5A and the secondary pulley 5B.

The controller 10 is configured as an electronic control unit, and includes a microcomputer including a central processing unit (CPU), various storage devices such as a RAM and a ROM, an input/output interface, and the like. The controller 10 may include a plurality of microcomputers. For example, an engine controller that controls the engine 1 and a transmission controller that controls the continuously variable transmission 5 may be provided, and these may be configured as a control module that is communicably connected via, for example, a CAN standard bus.

[Sailing Stop Control]

In the vehicle of the present embodiment, sailing stop (hereinafter, also referred to as SS) control is performed. The SS control is a control in which, when a predetermined SS condition is satisfied during traveling, the engine 1 is stopped and the forward clutch 3 is released for traveling by inertia. The SS condition includes, for example, a condition that the vehicle speed is equal to or higher than a threshold value, a condition that the accelerator position is constant, and a condition that the brake depression force is zero. The threshold value of the vehicle speed is set so as to divide the vehicle speed into a low speed and a medium/high speed. A specific threshold value is set in advance by an experiment or the like. During the SS control, the forward clutch 3 is released, so that power transmission between the engine 1 and the drive wheel 7 is cut off, and thus an energy loss due to an engine brake is reduced. That is, when the SS control is performed, the fuel efficiency of the vehicle is improved by stopping the engine 1 and reducing the above-mentioned energy loss.

The SS control is cancelled when the SS condition is no longer satisfied. For example, when the driver depresses the accelerator pedal or the brake pedal, or when the vehicle speed falls below the threshold value, the SS control is cancelled.

Incidentally, since the vehicle speed during the SS control is equal to or higher than the threshold value, that is, the vehicle speed is the medium/high speed, the gear ratio of the continuously variable transmission 5 is controlled to a high side, that is, a relatively small side. Therefore, for example, in a case where the driver depresses the accelerator pedal by a large amount for overtaking or the like, when the forward clutch 3 is engaged and the SS control is cancelled while maintaining the gear ratio during the SS control, there is a concern that the driver cannot obtain a sufficient acceleration feeling.

As a measure to obtain a sufficient acceleration feeling after the cancellation of the SS control, it is considered that when the SS control is cancelled, the gear ratio of the continuously variable transmission 5 is shifted to a low side, that is, a relatively large side. However, for example, in a case where the depression amount of the accelerator pedal by the driver is smaller than that in the case of overtaking, when the gear ratio is excessively increased, an amount of change in vehicle propulsion in response to the depression amount of the accelerator pedal becomes large, and there is a concern that the driver may feel uncomfortable. For example, even when the depression amount of the accelerator pedal is very small as in a case where the vehicle speed is finely adjusted, there is a concern that the driver may feel uncomfortable in the same manner.

If there is a difference in rotation speed between an input side and an output side of the forward clutch 3 when the SS control is cancelled, there is a concern that a shock may occur when the forward clutch 3 is engaged. It is preferable that the shock at the time of this engagement is small.

Therefore, in order to realize acceleration corresponding to the acceleration intention of the driver while preventing the shock at the time of the engagement of the forward clutch 3, the controller 10 executes control described below when the SS control is cancelled.

[Control at the Time of Cancellation of SS Control]

Figure 2:
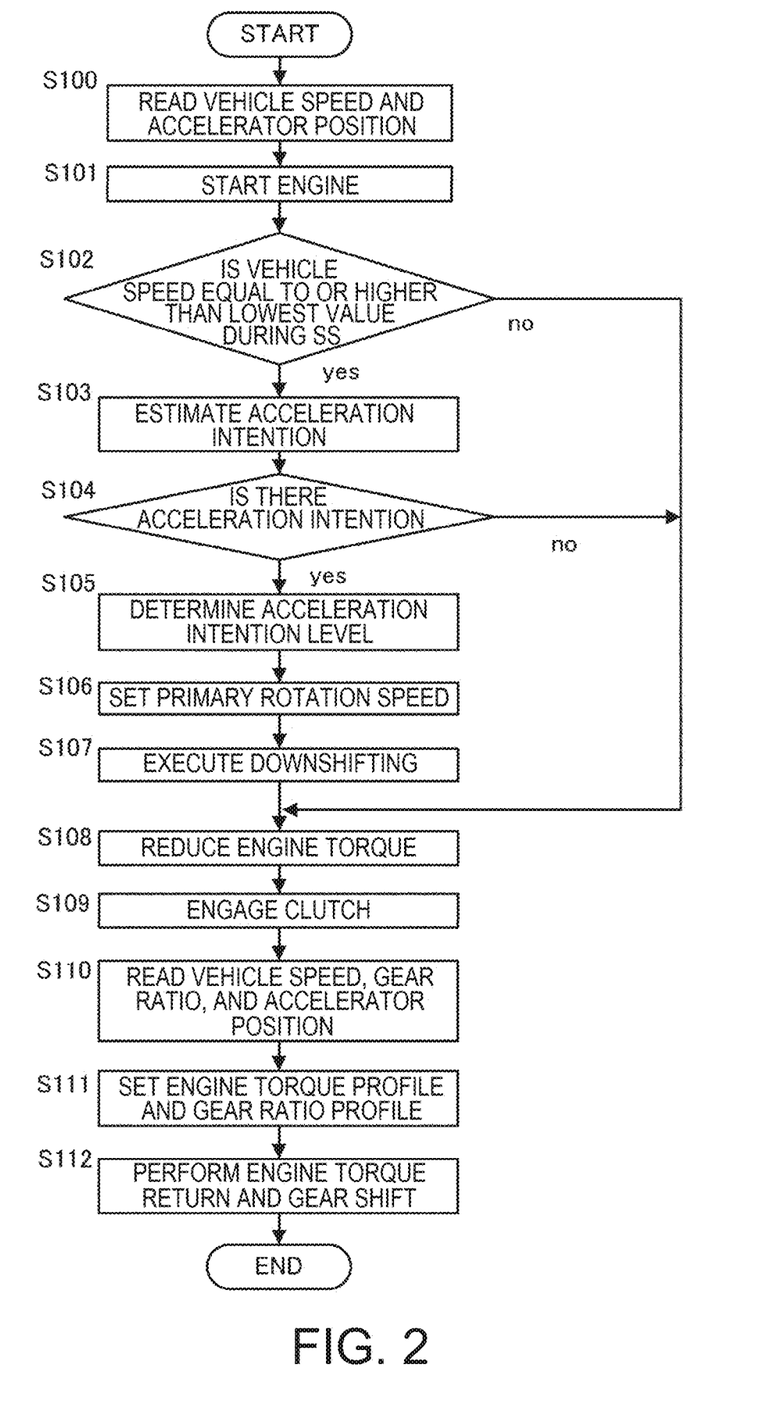
FIG. 2 is a flowchart illustrating a control routine when sailing stop control is cancelled.

FIG. 2 is a flowchart illustrating an example of a control routine executed by the controller 10. When the SS condition is no longer satisfied during the SS control, the controller 10 executes the process of the flowchart.

In the process of the flowchart, when the SS control is cancelled, first, the engine 1 is restarted, and when the driver has the acceleration intention, a first control is executed in which the continuously variable transmission 5 is downshifted to increase an input shaft rotation speed of the continuously variable transmission 5, and then the forward clutch 3 is engaged. On the other hand, when the driver does not have the acceleration intention, a second control is executed in which the forward clutch 3 is engaged while maintaining the input shaft rotation speed during the execution of the SS control. Hereinafter, the process will be described for each step of the flowchart.

In step S100, the controller 10 reads the vehicle speed and the accelerator position at that time. Specifically, detection values of the vehicle speed sensor 22 and the accelerator sensor 20 are read.

In step S101, the controller 10 starts the engine 1. The controller 10 sets a target value (hereinafter, also referred to as a "target engine torque") of a torque of the engine 1 (hereinafter, also simply referred to as an "engine torque") based on the vehicle speed and the accelerator position. Then, the engine 1 is cranked in the same manner as in the general engine start control, and fuel injection and ignition are started when the engine rotation speed reaches a predetermined engine rotation speed. When the engine 1 starts an operation, an intake air amount, the fuel injection amount, the ignition timing, and the like are controlled in accordance with the target engine torque.

In step S102, the controller 10 determines whether the vehicle speed read in step S100 is equal to or higher than the vehicle speed at which the gear ratio is the lowest in the SS control. Specifically, a gear shift map in which the gear ratio for each vehicle speed is set is stored in advance in the controller 10, and the determination is performed using the read vehicle speed and the gear shift map. When a determination result is positive, the process of step S103 is executed, and when the determination result is negative, the process of step S108 is executed.

In step S103, the controller 10 estimates the acceleration intention of the driver. Specifically, the estimation is performed as follows.

Figure 3:
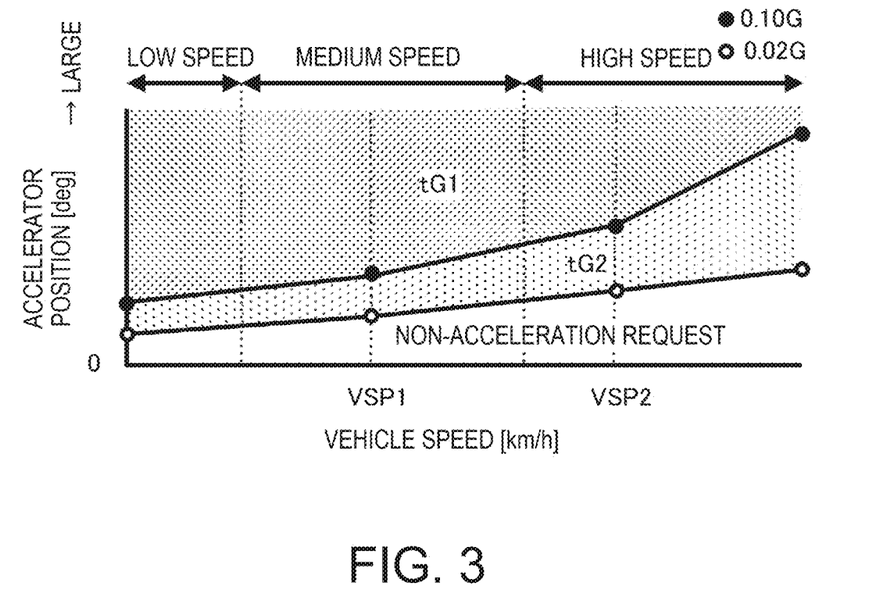
FIG. 3 is a map used for estimating an acceleration intention.

FIG. 3 is a map used for estimating the acceleration intention of the driver. The map is also created in advance and stored in the controller 10.

In FIG. 3, the vertical axis represents the accelerator position, and the horizontal axis represents the vehicle speed. Although the SS control is executed in a medium/high speed range, a low speed range is also included in the map of FIG. 3. This is because there is a case where the vehicle enters a steep slope road or the like during the SS control and the vehicle speed rapidly decreases.

FIG. 3 includes a non-acceleration intention region, a tG2 region, and a tG1 region in order from the smallest accelerator position. The tG2 region is a region in which an acceleration required by the driver is estimated to be small based on the vehicle speed and the accelerator position. The tG1 region is a region in which the acceleration required by the driver is estimated to be large based on the vehicle speed and the accelerator position.

The large required acceleration referred to herein indicates an acceleration to such an extent that the driver feels a strong sense of acceleration, for example, 0.1 [G] or more. Similarly, the small required acceleration indicates an acceleration to such an extent that the driver does not feel a strong sense of acceleration but can recognize that the vehicle is accelerating, for example, larger than 0.02 [G] and smaller than 0.1 [G]. When the required acceleration is, for example, 0.02 [G] or less, it is determined that there is no acceleration intention.

The reason why an accelerator position serving as a boundary between the non-acceleration intention region and the tG2 region, and an accelerator position serving as a boundary between the tG2 region and the tG1 region increase as the vehicle speed increases is that, the accelerator position for maintaining the vehicle speed, and the depression amount of the accelerator pedal when the vehicle is to be accelerated increase as the vehicle speed increases.

In step S103, an operating point determined by the vehicle speed and the accelerator position read in step S100 is plotted on the above-mentioned map.

In step S104, the controller 10 determines whether there is an acceleration intention. Specifically, when the operating point plotted in step S103 is in the tG2 region or the tG1 region, it is determined that there is an acceleration intention, and when the operating point plotted in step S103 is in the non-acceleration intention region, it is determined that there is no acceleration intention. In the case where there is an acceleration intention, the controller 10 executes the process of step S105, and in the case where there is no acceleration intention, the controller 10 executes the process of step S108.

In step S105, the controller 10 determines an acceleration intention level. Specifically, the controller 10 determines whether the operating point is in the tG2 region or the tG1 region.

In step S106, the controller 10 sets a target value (hereinafter, also referred to as a "target primary rotation speed") of the rotation speed of the primary pulley 5A (hereinafter, also referred to as a "primary rotation speed"). The target primary rotation speed refers to a primary rotation speed that is achieved by downshifting that is performed when the driver has the acceleration intention. Specifically, the target value is set as follows.

Figure 4:
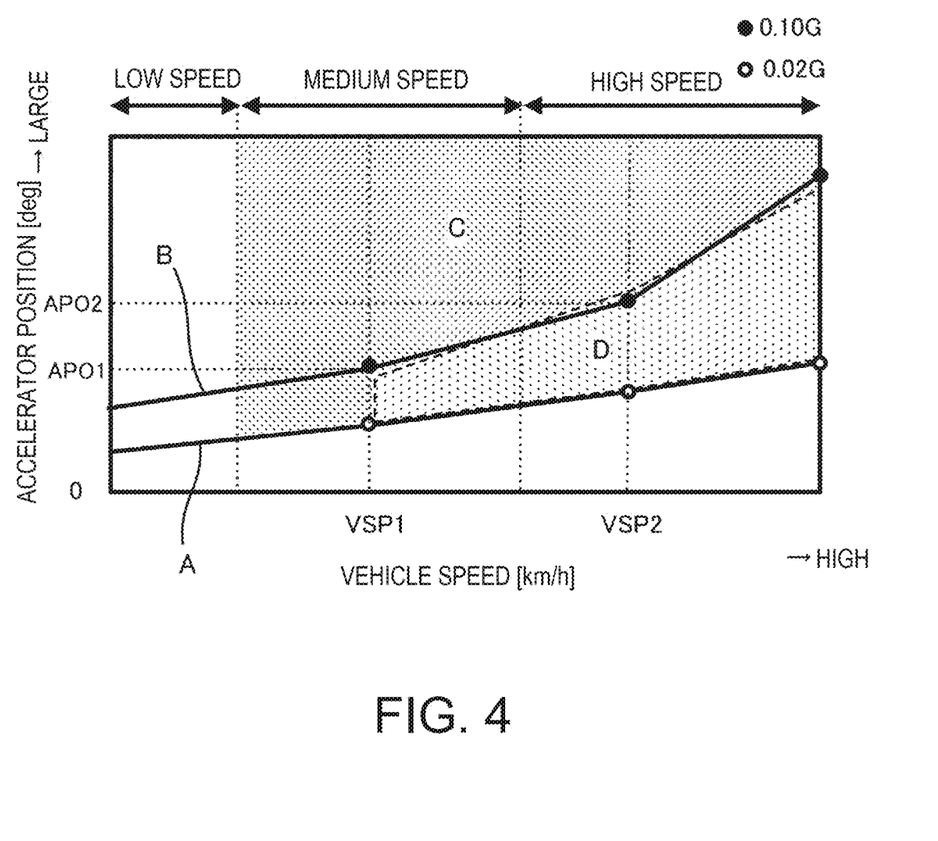
FIG. 4 is a map used for setting a target primary rotation speed.

FIG. 4 is a map used for setting the target primary rotation speed. The map is also created in advance and stored in the controller 10.

In FIG. 4, the vertical axis represents the accelerator position, and the horizontal axis represents the vehicle speed. A solid line A in the drawing is a boundary line between a non-acceleration request region and the tG2 region in FIG. 3, and a solid line B is a boundary line between the tG2 region and the tG1 region in FIG. 3.

As illustrated in FIG. 4, in the map, a C region constituted by a medium/high speed region of the tG1 region and a part of a medium speed region of the tG2 region, and a D region constituted by other parts of the tG2 region are set. The C region is a region in which the target primary rotation speed is R1 [rpm], and the D region is a region in which the target primary rotation speed is R2 [rpm]. Here, a relation of R1<R2 is established between the target primary rotation speed R1 and the target primary rotation speed R2. For example, since the operating point is in the C region when the vehicle speed is VSP1 and the accelerator position is APO1, the target primary rotation speed is R1. Since the operating point is in the D region when the vehicle speed is VSP2 and the accelerator position is APO2, the target primary rotation speed is R2.

In the present embodiment, a region in which the downshifting is performed is divided into the C region and the D region, and the target primary rotation speed is set for each region, but the region and the target primary rotation speed may be further subdivided.

In step S107, the controller 10 executes the downshifting in accordance with the target primary rotation speed set in step S106.

In step S108, the controller 10 reduces the engine torque to zero [Nm] by, for example, retarding the ignition timing. By setting a torque input from the engine 1 to the forward clutch 3 to zero [Nm] when the forward clutch 3 is engaged, it is possible to prevent a shock (hereinafter, also referred to as an "engagement shock") generated when the forward clutch 3 is engaged even in a state in which the gear ratio is increased and the primary rotation speed is increased. The zero [Nm] referred to herein includes not only zero [Nm] in a strict sense but also an engine torque near zero [Nm] that can prevent the engagement shock to such an extent that the engagement shock can be regarded as being equivalent to that in the case of zero [Nm].

A time required to reduce the engine torque to zero [Nm] is preferably as short as possible in order to quickly engage the forward clutch 3. Therefore, the controller 10 reduces the engine torque with a reduction speed as high as possible in accordance with a retardation limit of the ignition timing or the like.

A quick engagement of the forward clutch 3 not only has an effect of improving an acceleration response after the cancellation of the SS control, but also has an effect of preventing the engagement shock. The reason why the engagement shock is prevented is that the engagement can be performed before the engine rotation speed decreases and the difference in rotation speed between the input side and the output side of the forward clutch 3 increases.

When the engine torque becomes zero [Nm] and the difference in rotation speed between the primary rotation speed and the engine rotation speed disappears, the controller 10 starts the engagement of the forward clutch 3 in step S109. The primary rotation speed and the engine rotation speed may not completely coincide with each other. For example, the engagement may be started when the difference in rotation speed is such that the generated engagement shock falls within an allowable range. Specific degree of the difference in rotation speed to be allowed is determined in advance by examining a relation between the difference in rotation speed and the magnitude of the engagement shock by an experiment or the like. In addition, in order to make it possible to quickly start the engaging operation in this step, a supply of a preload to the forward clutch 3 is started at a timing at which the start control of the engine 1 is started.

In step S110, the controller 10 reads the vehicle speed, the gear ratio, and the accelerator position.

In step S111, the controller 10 sets, based on data read in step S110, an engine torque profile from zero [Nm] at the start of the engaging operation of the forward clutch 3 to the engine torque reaching the required engine torque, and a gear ratio profile after the engagement of the forward clutch 3. The required engine torque referred to herein indicates an engine torque corresponding to the acceleration required by the driver.

In the present embodiment, the profile is set such that the engine torque increases at a first inclination for a predetermined time after the engagement of the forward clutch 3 and increases at a second inclination greater than the first inclination after the predetermined time elapses.

The reason why the engine torque is first increased with the relatively small first inclination is to prevent a shock (hereinafter, also referred to as a "gear rattle shock") caused by a gear rattle in association with a start of acceleration.

Here, the gear rattle shock will be described. Backlashes are formed in a spline fitting portion that connects shafts in a power transmission path and in a gear mechanism such as a final gear. During coasting, the backlash of each portion is in a blocked state due to rotation input from the drive wheel 7. When the acceleration is started from this state, the rotation is input from the engine 1, so that the backlash is blocked on a side opposite to that during coasting. This shock, which is generated due to collision between splines and collision between teeth of the gear when the backlash is blocked on the side opposite to a previous side, is the gear rattle shock. The gear rattle shock increases as the splines or the like strongly collide.

Therefore, until the backlash is blocked on the side opposite to that during coasting, the first inclination is set to be relatively small with priority given to reduction of the gear rattle shock, and after the backlash is blocked, the second inclination is set to be relatively large with priority given to the acceleration performance. A timing of switching from the first inclination to the second inclination is managed using, for example, a timer. Specifically, first, a time required for the backlash to be blocked on the side opposite to the previous side is examined and mapped for each of various conditions using the vehicle speed, the accelerator position, and the gear ratio as parameters by experiments or the like, and the map is stored in the controller 10. Then, at the time of execution of the control routine, the map is searched, and an obtained time is set in the timer. When the engagement of the forward clutch 3 is started, the timer is activated, and when the set time elapses, the inclination is switched to the second inclination.

The controller 10 sets the first inclination and the second inclination based on the vehicle speed, the accelerator position (that is, the required engine torque), and the gear ratio in consideration of a balance between the acceleration response, the gear rattle shock, and the like. For example, for each of the first inclination and the second inclination, the map using the vehicle speed, the accelerator position, and the gear ratio as the parameters is created and stored in the controller 10. Then, the first inclination and the second inclination are set by searching the map at the time of the execution of the control routine. The same applies to the gear ratio profile.

Specific magnitudes of the first inclination and the second inclination, and the gear ratio profile vary depending on specifications, for example, output characteristics of the engine 1, a vehicle weight, and the like, of the vehicle to which the present embodiment is applied, but there are trends which are common regardless of the specifications of the vehicle. These trends will be described below.

In general, when the vehicle speed is in a high speed range, the gear ratio is controlled to be relatively high. Therefore, the gear rattle shock after the forward clutch 3 is engaged and a pull-in shock generated due to a rotation inertia at the time of shifting are not easily transmitted to occupants including the driver. On the other hand, since a traveling resistance is large in the high speed range, the gear ratio being on the high side is disadvantageous from a viewpoint of the acceleration response. Therefore, as the vehicle speed increases, the first inclination and the second inclination are increased. On the contrary, as the vehicle speed decreases, the first inclination and the second inclination are reduced.

In addition, a large accelerator position means that the acceleration required by the driver is large. Therefore, when the accelerator position is large, a shift speed of the continuously variable transmission 5 is set to be large in order to increase the acceleration response. Also, the first inclination and the second inclination are also increased in order to prevent the pull-in shock. On the contrary, when the accelerator position is small, the shift speed, the first inclination, and the second inclination are set to be small. As a result, it is possible to further prevent the gear rattle shock and the pull-in shock.

After the engine torque profile and the gear ratio profile are set as described above, in step S112, the controller 10 executes control of the engine torque and shift control according to the each profile.

Figure 5:
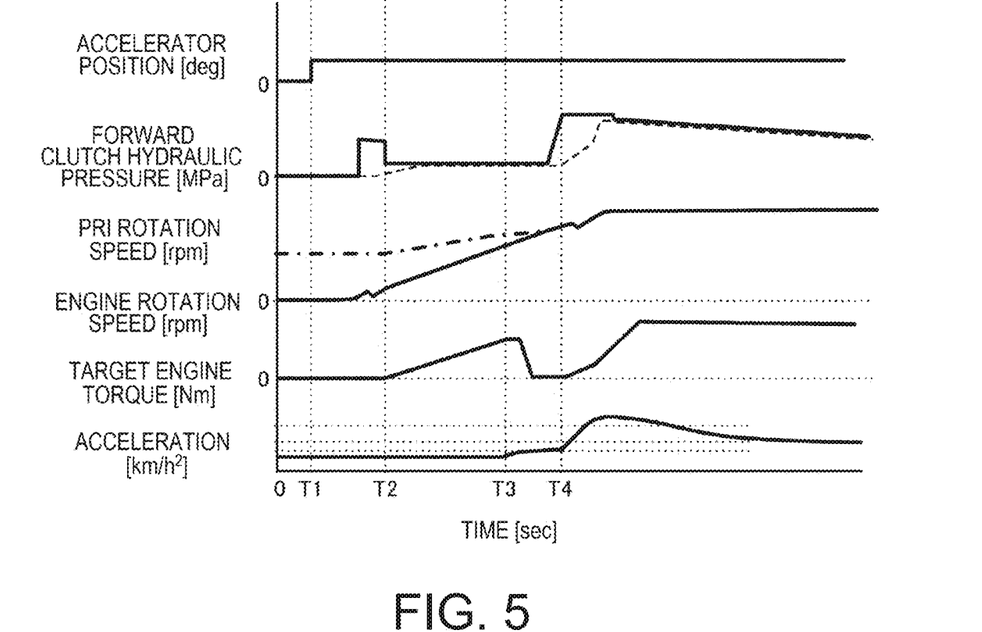
FIG. 5 is a diagram illustrating an example of a timing chart when the control routine in FIG. 2 is executed.

FIG. 5 is an example of a timing chart when the above-described control routine is executed.

When the accelerator pedal is depressed at a timing T1 during the SS control, the controller 10 determines to cancel the SS control, and cranking is started to start the engine 1. Also, the supply of the hydraulic pressure to the forward clutch 3 is started, and the forward clutch 3 is in a state in which the preload is applied. In the drawing, a solid line of a forward clutch hydraulic pressure represents a command value, and a broken line represents an actual value.

When the engine 1 is started at a timing T2, the controller 10 sets the target engine torque corresponding to the accelerator position, and accordingly, the engine rotation speed (solid line in the drawing) increases. In addition, the controller 10 performs the downshifting in accordance with the increase in the engine rotation speed, and accordingly, the primary rotation speed (indicated by a dashed line in the drawing) also increases.

When the controller 10 determines that the engine rotation speed gets closer to the primary rotation speed at a timing T3, the controller 10 reduces the engine torque to zero [Nm] prior to the engagement of the forward clutch 3, and then increases the forward clutch hydraulic pressure to engage the forward clutch 3.

When the forward clutch hydraulic pressure reaches an engagement hydraulic pressure at a timing T4, the controller 10 sets the engine torque profile until the engine torque reaches the required engine torque, and increases the engine torque according to the profile.

By the above-mentioned control, the acceleration quickly increases after the forward clutch 3 is engaged.

Figure 6:
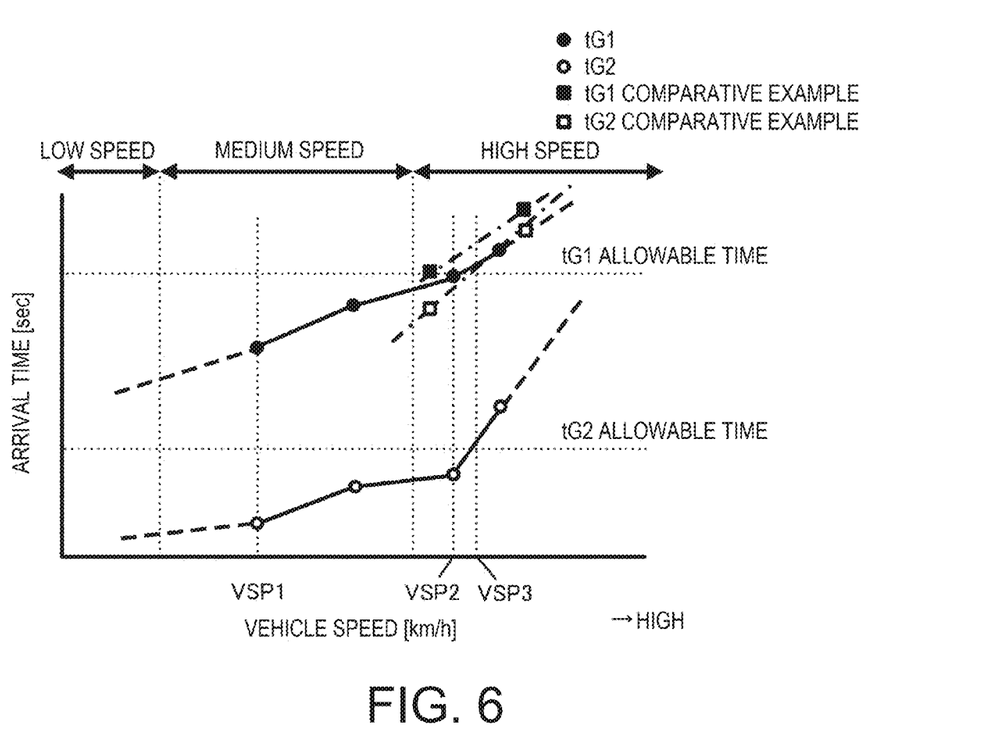
FIG. 6 is a diagram for explaining an effect of the present invention.

FIG. 6 is a diagram illustrating an effect obtained when the above-described control is executed at the time of the cancellation of the SS control. An arrival time on the vertical axis is a time from when the driver depresses the accelerator pedal to when the acceleration reaches the required acceleration corresponding to the accelerator position. The vehicle speed on the horizontal axis is a vehicle speed when the accelerator pedal is depressed, that is, when it is determined to cancel the SS control. A tG1 allowable time and a tG2 allowable time are the longest arrival times allowable by the driver when the acceleration intention level is in the tG1 region and the tG2 region, respectively. Specifically, the arrival time and the vehicle speed are set based on a result of a sensory test or the like. A tG1 comparative example and a tG2 comparative example indicate arrival times when the SS control is cancelled without executing the control of the present embodiment when the acceleration intention level is in the tG1 region and the tG2 region, respectively.

As illustrated in FIG. 6, in a case where the acceleration intention level is in the tG1 region, when the vehicle speed is equal to or lower than the vehicle speed VSP2, the arrival time becomes shorter than the tG1 allowable time by executing the control routine of the present embodiment. On the other hand, in the tG1 comparative example, the arrival time exceeds the tG1 allowable time at a vehicle speed lower than the vehicle speed VSP2. In a region where the vehicle speed exceeds the vehicle speed VSP2, the arrival time exceeds the tG1 allowable time also by the control routine of the present embodiment, but the arrival time is shorter than that in the tG1 comparative example.

In a case where the acceleration intention level is in the tG2 region, when the vehicle speed is equal to or lower than a vehicle speed VSP3 that is higher than the vehicle speed VSP2, the arrival time becomes shorter than the tG2 allowable time by executing the control routine of the present embodiment. On the other hand, in the tG2 comparative example, the arrival time greatly exceeds the tG2 allowable time even in a case where a vehicle speed is lower than the vehicle speed VSP2. In addition, in a region where the vehicle speed exceeds the vehicle speed VSP3, the arrival time exceeds the tG2 allowable time also by the control routine of the present embodiment, but the arrival time is much shorter than that of the tG2 comparative example.

As described above, by executing the control routine of the present embodiment, the arrival time allowable by the driver can be achieved in a region in which the vehicle speed is equal to or less than the vehicle speed VSP2 when the acceleration intention level is in the tG1 region, and in a region in which the vehicle speed is equal to or less than the vehicle speed VSP3 when the acceleration intention level is in the tG2 region. In addition, even in a vehicle speed region in which the arrival time allowable by the driver cannot be achieved, the arrival time can be shortened as compared with a case where the control routine of the present embodiment is not executed.

When VSP2 is set to be the upper limit vehicle speed in which the execution of the SS control is permitted, the arrival time allowable for the driver can be achieved in an entire vehicle speed region of which the SS control is executed.

As described above, in the vehicle control method according to the present embodiment, when the SS condition (drive source stop condition) is satisfied during traveling of the vehicle, the engine 1 (drive source of the vehicle) is stopped and the forward clutch (engagement element) 3 provided in the power transmission path between the engine 1 and the continuously variable transmission 5 is released and the controller 10 executes the SS control for traveling by inertia. When the SS condition becomes unsatisfied, the controller 10 restarts the engine 1, and when the driver has the acceleration intention, the controller 10 executes the first control in which the continuously variable transmission 5 is downshifted to increase the input shaft rotation speed of the continuously variable transmission 5, and then the forward clutch 3 is engaged. As a result, the driving force (that is, the vehicle propulsion) after the forward clutch 3 is engaged can be increased, and the driver can feel the acceleration feeling more quickly.

In the present embodiment, when the driver does not have the acceleration intention, the controller 10 executes the second control in which the forward clutch 3 is engaged while maintaining the input shaft rotation speed during the execution of the SS control. As a result, a shock when the forward clutch 3 is engaged can be prevented, and a time until the engagement is performed can be shortened, thereby enhancing responsiveness to an operation such as an additional depression of the accelerator pedal thereafter.

In the present embodiment, the first control is executed when the driver has the acceleration intention, and the second control is executed when the driver does not have the acceleration intention, but the present invention is not limited thereto. Any configurations may be adopted as long as the gear ratio of the continuously variable transmission 5 in the case of the driver having the acceleration intention is increased compared to the case of not having the acceleration intention and then the forward clutch 3 is engaged. For example, the first control may not be executed when the driver has the acceleration intention, and upshifting may be performed when the driver does not have the acceleration intention. Alternatively, the first control may be executed when the driver has the acceleration intention, and the downshifting may be executed such that the gear ratio is lower than that in the first control when the driver does not have the acceleration intention. In either case, it is possible to make the driver feel the acceleration feeling more quickly when the driver has the acceleration intention than when the driver does not have the acceleration intention. In addition, as compared with a case where the driver has the acceleration intention, when the driver does not have the acceleration intention, the shock due to engagement of the forward clutch 3 can be prevented and the time to performing the engagement can be shortened, thereby enhancing the responsiveness to the operation such as an additional depression of the accelerator pedal thereafter.

In the present embodiment, the controller 10 controls an increase amount of the input shaft rotation speed of the continuously variable transmission 5 in accordance with a degree of the acceleration intention when the first control is executed. Specifically, as the acceleration required by the driver increases, the increase amount of the input shaft rotation speed of the continuously variable transmission 5 is increased. As a result, a balance between improvement of the acceleration response, and prevention of the shock at the time of the engagement and reduction of the time until the engagement is performed can be adjusted in accordance with the degree of the acceleration intention.

In the present embodiment, the controller 10 determines the degree of the acceleration intention based on the vehicle speed and the accelerator position. As a result, the degree of the acceleration intention of the driver can be appropriately determined.

In the present embodiment, the controller 10 executes the first control when the vehicle speed is equal to or higher than the vehicle speed at which the gear ratio of the continuously variable transmission 5 becomes the lowest during the execution of the SS control. This is because the input shaft rotation speed of the continuously variable transmission 5 cannot be increased any more when the gear ratio is the lowest during the SS control.

In the present embodiment, the controller 10 engages the forward clutch 3 after reducing the torque of the engine 1 to zero [Nm]. As a result, even when the gear ratio is increased and the input shaft rotation speed of the continuously variable transmission 5 is increased, the shock generated when the forward clutch 3 is engaged can be prevented.

In the present embodiment, the controller 10 sets the torque profile of the engine 1 and the gear shift profile of the continuously variable transmission 5 from zero [Nm] to the engine torque corresponding to the acceleration intention after the forward clutch 3 is engaged, in accordance with the vehicle speed, the gear ratio, and the accelerator position. Accordingly, the gear rattle shock and the pull-in shock after the forward clutch 3 is engaged can be prevented and the acceleration response can be improved in an appropriate balance depending on vehicle states such as the vehicle speed, the gear ratio, and the accelerator position.

Although the embodiments of the present invention have been described above, the above embodiments merely exemplify some of application examples of the present invention and do not intend to limit the technical scope of the present invention to the specific configurations of the above embodiments.

The invention claimed is:

1. A vehicle control method executed by a controller, wherein the controller executes sailing stop control in which, when a drive source stop condition is satisfied during traveling, a drive source is stopped and an engagement element provided in a power transmission path between the drive source and a continuously variable transmission is released for traveling by inertia, the method comprising:
   restarting the drive source when the drive source stop condition becomes unsatisfied;
   estimating an acceleration intention of a driver, and
   setting, in a case of a driver having acceleration intention, a gear ratio of the continuously variable transmission to be larger than that of a case where the driver does not have the acceleration intention, and then engaging the engagement element,
   wherein in the case of the driver having the acceleration intention, the controller executes a first control in which the continuously variable transmission is downshifted to increase an input shaft rotation speed of the continuously variable transmission and then the engagement element is engaged, and
   wherein the controller executes the first control when a vehicle speed is equal to or higher than a vehicle speed at which the gear ratio of the continuously variable transmission becomes lowest during the execution of the sailing stop control.

2. The vehicle control method according to claim 1, wherein
   when the driver does not have the acceleration intention, the controller executes a second control in which the engagement element is engaged while maintaining an input shaft rotation speed during execution of the sailing stop control.

3. The vehicle control method according to claim 1, wherein
   when executing the first control, the controller controls an increase amount of the input shaft rotation speed in accordance with a degree of the acceleration intention.

4. The vehicle control method according to claim 3, wherein
   the controller determines the degree of the acceleration intention based on a vehicle speed and an accelerator position.

5. The vehicle control method according to claim 1, wherein
   the controller engages the engagement element after reducing a torque of the drive source to zero [Nm].

6. The vehicle control method according to claim 5, wherein
   in accordance with a vehicle speed, the gear ratio, and an accelerator position, the controller sets a torque profile of the drive source from zero [Nm] to an engine torque corresponding to the acceleration intention after the engagement element is engaged, and a gear shift profile of the continuously variable transmission.

7. A vehicle control device for controlling a vehicle, the vehicle comprising:
   a drive source;
   a continuously variable transmission;
   an engagement element interposed in a power transmission path between the drive source and the continuously variable transmission; and
   a controller configured to execute sailing stop control in which, when a drive source stop condition is satisfied during traveling, the drive source is stopped and the engagement element is released for traveling by inertia, wherein
   the controller is configured to:
      terminate the sailing stop control when the drive source stop condition becomes unsatisfied;
      estimate an acceleration intention of a driver, and
      in a case of the driver having the acceleration intention, set a gear ratio of the continuously variable transmission to be larger than that of a case where the driver does not have the acceleration intention, and then engage the engagement element,
   wherein in the case of the driver having the acceleration intention, the controller executes a first control in which the continuously variable transmission is downshifted to increase an input shaft rotation speed of the continuously variable transmission and then the engagement element is engaged, and
   wherein the controller executes the first control when a vehicle speed is equal to or higher than a vehicle speed at which the gear ratio of the continuously variable transmission becomes lowest during the execution of the sailing stop control.

* * * * *